(12) United States Patent
Bai et al.

(10) Patent No.: US 10,233,377 B1
(45) Date of Patent: Mar. 19, 2019

(54) GEL PLUGGING SLURRY FOR WELL DRILLING AND PREPARATION METHOD THEREOF, AND SLUG PLUGGING METHOD

(71) Applicant: Southwest Petroleum University, Chengdu (CN)

(72) Inventors: Yang Bai, Chengdu (CN); Pingya Luo, Chengdu (CN); Jiading Deng, Chengdu (CN)

(73) Assignee: SOUTHWEST PETROLEUM UNIVERSITY (CN)

( * ) Notice: Subject to any disclaimer, the term of this patent is extended or adjusted under 35 U.S.C. 154(b) by 0 days.

(21) Appl. No.: 16/154,662

(22) Filed: Oct. 8, 2018

Related U.S. Application Data

(63) Continuation of application No. PCT/CN2018/096848, filed on Jul. 24, 2018.

(51) Int. Cl.
| | |
|---|---|
| *C09K 8/467* | (2006.01) |
| *C09K 8/42* | (2006.01) |
| *E21B 33/13* | (2006.01) |

(52) U.S. Cl.
CPC .............. *C09K 8/426* (2013.01); *E21B 33/13* (2013.01); *C09K 2208/04* (2013.01); *C09K 2208/08* (2013.01)

(58) Field of Classification Search
CPC ........ C09K 8/512; C09K 8/5045; C09K 8/08; C09K 2208/08; C09K 2208/10; C09K 8/467; C09K 8/487; C09K 8/508; C09K 2208/26; C09K 2208/30; C09K 8/68; C09K 2208/18; C09K 8/426; C09K 8/46; C09K 8/5086; C09K 8/514; C09K 8/516; C09K 8/90

See application file for complete search history.

(56) References Cited

U.S. PATENT DOCUMENTS

| | | | |
|---|---|---|---|
| 10,017,679 B1 * | 7/2018 | Luo | C04B 28/02 |
| 2017/0198190 A1 * | 7/2017 | Maxey | C09K 8/467 |

FOREIGN PATENT DOCUMENTS

| | | | |
|---|---|---|---|
| CN | 101525985 | * | 9/2009 |
| CN | 104563952 | * | 4/2015 |
| CN | 104563952 A | | 4/2015 |
| CN | 105647495 | * | 6/2016 |

* cited by examiner

*Primary Examiner* — Kumar R Bhushan
(74) *Attorney, Agent, or Firm* — Calfee, Halter & Griswold LLP

(57) ABSTRACT

A gel plugging slurry for well drilling, comprising water, special gel, bridging material, linking material, and packing material, wherein based on 100 parts by weight of the water, the amount of the special gel is 1-15 parts by weight, the amount of the bridging material is 8-20 parts by weight, the amount of the linking material is 20-40 parts by weight, and the amount of the packing material is 25-45 parts by weight. The gel slug plugging method including simple operation and low requirement for ambient environment; besides, the bridging material, linking material and packing material in the gel plugging slurry form stable structures in the gel, and thereby the gel plugging effect can be improved effectively.

16 Claims, No Drawings

GEL PLUGGING SLURRY FOR WELL DRILLING AND PREPARATION METHOD THEREOF, AND SLUG PLUGGING METHOD

CROSS REFERENCE TO RELATED APPLICATIONS

This application is a continuation and claims priority to PCT/CN2018/096848 filed Jul. 24, 2018, which claims priority to Chinese Application No. 201810812801.6, filed on Jul. 23, 2018, entitled "Gel Plugging Slurry for Well Drilling and Preparation Method Thereof, and Slug Plugging Method", which are specifically and entirely incorporated by reference.

FIELD OF THE INVENTION

The present invention relates to the well drilling plugging field in the petroleum industry, in particular to a gel plugging slurry for well drilling, a preparation method of the gel plugging slurry, and a slug plugging method.

BACKGROUND OF THE INVENTION

Bridge plugging techniques are widely applied domestically and abroad, and have advantages including high plugging speed, low cost, and easy operation, etc. The diameters of plugging particles used in bridge plugging techniques may be up to several millimeters or even several centimeters, or down to tens of micrometers. Therefore, bridge plugging techniques can attain an effect of mitigating lost circulation or completely plugging the lost circulation zone and improving bearing capacity, no matter whether the lost circulation is porous lost circulation, fractural lost circulation, or cavity lost circulation. However, the success ratio of conventional bridge plugging is very low, owing to a fact that formation fluids exist in the lost circulation zone of reservoir; the formation fluids refer to oil, natural gas, water, and their mixtures in the formation, such as reservoir water with dissolved inorganic and organic components and natural gas. It is well known that all processes of oil-gas reservoir, ranging from accumulation of organic substances to oil and gas generation, migration, accumulation and reservoir forming, and destroy of oil-gas reservoir, are related with formation water.

CN104563952A disclosed a non-cross-linked special gel plugging method, which comprises: running a plain drill pipe to 20-30 m above the top of a lost circulation zone, and spudding up and down; preparing non-cross-linked special gel plugging slurry that consists of water, special gel ZND-2 plugging agent, gelatinous fiber plugging agent, and rigid wedge plugging agent in a clean slurry tank, wherein the non-cross-linked special gel plugging slurry is prepared by adding 0.8-1.6 parts by weight of special gel ZND-2 plugging agent, 5-8 parts by weight of gelatinous fiber plugging agent, and 10-15 parts by weight of rigid wedge plugging agent in every 100 parts by weight of water and mixing the components intensively; injecting the non-cross-linked special gel plugging slurry into the lost circulation zone in the well immediately after the preparation, and holding the non-cross-linked special gel plugging slurry in still state for 4-8 h. However, the method has the following drawbacks: the plugging slurry is held in still state for gelatinization at the lost circulation zone in the well for so long time that it may be mixed with the formation fluids and thinned; consequently, the plugging slurry flows into the deep portion of the formation and results in plugging failure. Besides, the amount of solid particles is too low (the concentration of the solid phase is too low) in the plugging slurry, and the particle size distribution of the solid particles is narrow; as a result, the plugging slurry has a poor plugging effect for leaking formations that have a wide span of fracture width, i.e., it doesn't have high general applicability. The plugging slurry can't be injected to the target formation (i.e., the leaking formation) accurately when it is injected into the well bore; consequently, material waste may occur and the plugging effect is not obvious.

Wherein, the special gel is a water-soluble polymer and has a good shear-thinning property. However, if the special gel is used solely in the plugging in a case that the leaking pressure difference is high, the actuation pressure drop gradient produced by the gel slugs formed by the special gel is not enough to resist the damage of the leaking pressure difference because the actuation pressure of the special gel is low (e.g., usually is 2-3 MPa); consequently, the plugging effect is not ideal, and secondary lost circulation may occur. A technique of plugging with cement after special gel is applied is relatively matured in actual application; however, if severe lost circulation occurs in the reservoir, cement plugging usually is not used to avoid injuries to the reservoir; instead, bridge plugging is often used in such a case. However, the success ratio of conventional bridge plugging is very low, owing to a fact that formation fluids exist in the lost circulation zone of reservoir. It is difficult to add bridge plugging materials into the gel plugging slurry because the gel plugging slurry has high cohesive force after it swells; consequently, the application of the special gel is limited.

Therefore, it is of great significance to develop a plugging method with plugging slurry.

SUMMARY OF THE INVENTION

To solve the technical problems in the prior art, i.e., the success ratio of conventional bridge plugging is very low owing to the existence of formation fluids in the lost circulation zone of reservoir, the success ratio of plugging is very low when bridge plugging is used solely, and the bearing capacity of gel is low, the present invention provides a gel plugging slurry for well drilling, a preparation method of the gel plugging slurry, and a slug plugging method. The gel slug plugging method provided in the present invention has advantages including simple operation and low requirement for ambient environment; besides, the bridging material, linking material and packing material in the gel plugging slurry provided in the present invention form stable structures in the gel, and thereby the gel plugging effect can be improved effectively.

To attain the objects described above, in a first aspect, the present invention provides a gel plugging slurry for well drilling comprising water, special gel, bridging material, linking material, and packing material, wherein based on 100 parts by weight of water, the amount of the special gel is 1-15 parts by weight, the amount of the bridging material is 8-20 parts by weight, the amount of the linking material is 20-40 parts by weight, and the amount of the packing material is 25-45 parts by weight.

In a second aspect, the present invention provides a method of preparing the above-mentioned gel plugging slurry comprising: adding 1-15 parts by weight of special gel, 8-20 parts by weight of bridging material, 20-40 parts by weight of linking material, and 25-45 parts by weight of packing material into 100 parts by weight of water sequentially and mixing homogeneously respectively under an agitation condition.

In a third aspect, the present invention provides a slug plugging method comprising the following steps:
(1) packing a well bore with packers;
(2) pumping the above-mentioned gel plugging slurry or a gel plugging slurry prepared with the above-mentioned preparation method into a leaking formation, and holding the gel plugging slurry in still state;
(3) removing the packers, and applying pressure to the well bore to squeeze the plugging slurry to the pores and fractures in the leaking formation, till the pressure in the well bore and the pressure in the formation are balanced.

With the technical scheme described above, the gel plugging slurry provided in the present invention requires less holding time for gelatinization, takes effect more quickly, and can form structures at the fractures in leaking formation quickly; in addition, the solid particles of the bridging material, linking material, and packing material, etc., in the gel plugging slurry provided in the present invention have wide particle size distribution ranges and form stable structures in the gel, so that the gel plugging slurry can effectively plug up different fractures in a very wide width range; in the gel slug plugging method for well drilling in the present invention, packers are applied to pack the well bore to ensure that the plugging slurry can reach to the leaking formation accurately, and thereby the plugging efficiency is improved.

DETAILED DESCRIPTION OF THE EMBODIMENTS

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

In a first aspect, the present invention provides a gel plugging slurry for well drilling comprising water, special gel, bridging material, linking material, and packing material, wherein based on 100 parts by weight of water, the amount of the special gel may be 1-15 parts by weight, the amount of the bridging material may be 8-20 parts by weight, the amount of the linking material may be 20-40 parts by weight, and the amount of the packing material may be 25-45 parts by weight.

According to the present invention, preferably, based on 100 parts by weight of water, the amount of the special gel is 3-9 parts by weight, the amount of the bridging material is 12-18 parts by weight, the amount of the linking material is 25-35 parts by weight, and the amount of the packing material is 30-40 parts by weight.

In the present invention, the special gel, bridging material, linking material, and packing material, which account for specific amounts in the gel plugging slurry, can form stable structures in the gel, and thereby the gel plugging effect can be improved effectively.

According to the present invention, there is no particular restriction on the water. For example, the water may be tap water and/or distilled water.

According to the present invention, the special gel (abbreviated as ZND) is a novel plugging material developed by Academician Ping Luo. In chemical nature, the special gel is a water-soluble polymer synthesized by introducing special functional groups to macromolecular chains on the basis of super-molecular chemistry and structural fluid theories. Therefore, when the special gel ZND is dissolved in water, the ZND molecular chains will be associated by Van der Waals force between hydrogen bond and hydrophobic groups, and thereby form a gel system with star structures and spatial network structures; in the present invention, the special gel may be ZND-1 and/or ZND-2; preferably, the special gel may be straw yellow transparent particles in 5-10 mm particle size, and the viscosity of the special gel may be $5\times10^5$ to $8\times10^5$ mPa·s under 1-10 $s^{-1}$ low shearing rate condition and 20-40 mPa·s under 1,000-1,500 $s^{-1}$ high shearing rate condition; in the present invention, the special gel is commercially available; for example, the special gel may be ZND-1 and/or ZND-2 from Sichuan Guangya Polymer Chemical Co., Ltd.

According to the present invention, the bridging material may be one or more of glass fibers, cotton seed balls, and/or asbestos fibers.

Wherein, the glass fibers (or fiber glass) are an inorganic non-metal material with outstanding performance, which mainly consists of silicon dioxide, aluminum oxide, calcium oxide, boron oxide, magnesium oxide, and sodium oxide, etc., and has advantages such as high electric insulation performance, high heat resistance performance, high corrosion resistance performance, and high mechanical strength, etc., but has high brittleness and poor wear resistance performance. The glass fibers are produced from seven mineral raw materials (pagodastone, quartz sand, limestone, dolomite, colemanite, and szaibelyite) through high-temperature melting, wire drawing, winding, and weaving processes, etc., the diameter of a single fiber is several micrometers to about twenty micrometers, equivalent to $\frac{1}{20}$-$\frac{1}{5}$ of the diameter of hair, and each bundle of raw fibers consists hundreds or even thousands of fibers.

Wherein, the cotton seed balls may be obtained by removing cotton seeds from seed cotton on a cotton ginning machine, wherein the seed cotton refers to cotton with seeds picked by cotton planters.

Wherein, the asbestos fibers are a silicate mineral material in a natural fiber form, belong to silicate mineral fibers in chemical composition of $Mg_6[Si_4O_{10}][OH]_8$, and are the only natural mineral fibers; they are fibrous, in greenish yellow or white color, in white color after splitting up into fine fibers, and have silky luster; the fibers are highly resilient, have high tensile strength, high heat insulation performance, and high corrosion resistance performance, and are nonflammable; there are a variety of asbestos fibers, and common asbestos fibers include chrysotile asbestos (white asbestos), amosite asbestos (brown asbestos), and crocidolite asbestos (blue asbestos).

Preferably, at least one of the bridging materials is glass fibers.

Preferably, the bridging material is a mixture of glass fibers, cotton seed balls, and/or asbestos fibers, and the mass ratio of the glass fibers to the cotton seed balls to the asbestos fibers may be (0.8-1.8):(1.2-2):1; more preferably is (1-1.4):(1.6-1.8):1.

Preferably, the bridging material is a mixture of glass fibers and cotton seed balls, and the mass ratio of the glass fibers to the cotton seed balls is (0.05-1.2):1; more preferably is (0.1-1):1.

Preferably, the bridging material is a mixture of glass fibers and asbestos fibers, and the mass ratio of the glass fibers to the asbestos fibers is (0.2-0.8):1; more preferably is (0.4-0.6):1.

In the present invention, the glass fibers belong to an inorganic non-metal material; in the present invention, the length of the glass fibers may be 200-500 μm, and the fineness may be 9-18 μm; preferably, the length is 300-400 μm, and the fineness is 10-15 μm.

In the present invention, the particle size of the cotton seed balls may be 15-90 μm, preferably is 20-80 μm.

In the present invention, the glass fibers, cotton seed balls, and asbestos fibers are commercially available. For example, they may be purchased from SWPU Jinniu Petroleum Technology Co., Ltd.

According to the present invention, the linking material may be oyster shells and/or walnut shells; in the present invention, preferably, the linking material is a mixture of oyster shells and walnut shells, and the mass ratio of the oyster shells to the walnut shells may be 1:(0.2-0.8), more preferably is 1:(0.4-0.6); more preferably, the linking material is walnut shells; in addition, in the present invention, the particle size of the oyster shells may be 5-15 mm, preferably is 8-10 mm; the particle size of the walnut shells may be 2-8 mm, preferably is 4-6 mm.

Moreover, it should be noted: in the present invention, the oyster shells are mantles of a mollusk living in or near water, i.e., a calcium compound secreted by special gland cells of the mollusk for protecting the soft portion of the body. The main constituents of oyster shells are 95% calcium carbonate and some chitin.

Moreover, it should be noted: in the present invention, the oyster shells and the walnut shells are filtering media in a granular form, which are produced through degreasing, crushing, and filtering processes, etc., have microporous surfaces and high adsorption performance.

Moreover, it should be noted: in the present invention, the particle sizes of the oyster shells and walnut shells refer to average particle diameters of the oyster shells and walnut shells in granular form.

In the present invention, the oyster shells and the walnut shells are commercially available. For example, the oyster shells and the walnut shells may be purchased from SWPU Jinniu Petroleum Technology Co., Ltd.

According to the present invention, the packing material may be millimicro barite powder, and the particle size of the packing material may be 0.1-10 μm, preferably is 4-6 μm.

In the present invention, the millimicro barite powder is commercially available. For example, the millimicro barite powder may be purchased from Guizhou Millimicro Powder Industry Co., Ltd.

In a second aspect, the present invention provides a method of preparing the above-mentioned gel plugging slurry comprising: adding 1-15 parts by weight of special gel, 8-20 parts by weight of bridging material, 20-40 parts by weight of linking material, and 25-45 parts by weight of packing material into 100 parts by weight of water sequentially and mixing homogeneously respectively under an agitation condition.

According to the present invention, there is no particular restriction on the agitating device. For example, the agitating device may be a slurry agitator; the agitation rate may be 1,000-5,000 rpm, preferably is 2,000-4,000 rpm; preferably, the preparation time of the plugging slurry may be 1-2.5 h, preferably is 1.5-2 h.

According to the present invention, the water and the special gel are agitated for 10-20 min. to a homogeneous state; then, the obtained mixture is mixed with the bridging material and agitated for 25-35 min. to a homogeneous state; then, the obtained mixture is mixed with the linking material and agitated for 25-30 min. to a homogeneous state; finally, the obtained mixture is mixed with the packing material and agitated for 10-15 min. to a homogeneous state.

According to a preferred embodiment of the present invention, the method for preparing a gel plugging slurry for well drilling comprises the following steps:
(1) pouring the water into an agitator and agitating at 2,000-4,000 rpm, adding the special gel into the agitator and agitating homogeneously for 10-20 min.;
(2) adding the bridging material slowly along the agitator arm, and agitating for 25-35 min. to a homogeneous state;
(3) adding the linking material slowly along the agitator arm, and agitating for 25-30 min. to a homogeneous state;
(4) finally, adding the packing material slowly along the agitator arm, and agitating for 10-15 min. to a homogeneous state.

In the present invention, an advantage of adding the components slowly along the agitator arm is that the solid components can be dispersed more uniformly in the plugging slurry.

In the present invention, the speed of slow addition may be 0.5-2 g/s, preferably is 1-1.5 g/s.

In a third aspect, the present invention provides a slug plugging method comprising the following steps:
(1) packing a well bore with packers;
(2) pumping the above-mentioned gel plugging slurry or a gel plugging slurry prepared with the above-mentioned preparation method into a leaking formation, and holding the gel plugging slurry in still state;
(3) removing the packers, and applying pressure to the well bore to squeeze the plugging slurry to the pores and fractures in the leaking formation, till the pressure in the well bore and the pressure in the formation are balanced.

According to the present invention, in the step (1), the packer is releasing packer, self-sealing test packer and/or layering packer; preferably is a layering packer.

In the present invention, using packers can attain the following advantage: the packers pack up the well bore, so that the plugging slurry can reach to the leaking formation accurately, and thereby the plugging efficiency can be improved.

According to the present invention, in the step (2), the pumping conditions include: the operating pressure may be 1-20 MPa; the temperature may be 15-30° C.; the flow rate may be 10-15 m$^3$/h; the outlet diameter may be DN100-120 mm; wherein in the present invention, DN (Diameter of Nominal) refers to nominal diameter or mean outside diameter, and it is a standard diameter series for containers, pipelines, and fittings. Employing nominal diameters is helpful for standardization of the parts, and can facilitate design, manufacturing, overhauling, and management, and thereby is helpful for reducing the manufacturing cost. For containers, the nominal diameter refers to the inner diameter; for pipelines, the nominal diameter is a value smaller than the outer diameter and greater than that the inner diameter. For a specific nominal diameter of pipeline, the outer diameter is a fixed value, while the inner diameter may vary with the wall thickness.

Preferably, in the step (2), the holding conditions include: the temperature may be 20-25° C., and the time may be 0.5-1 h.

In the present invention, holding in still state can attain the following advantage: the plugging slurry can form structures in the leaking formation, so that the formation is isolated from the well bore.

Preferably, in the step (3), the pressure is 3-10 MPa.

In the present invention, heavy slurry may be circulated till the pressure in the well bore and the pressure in the formation are balanced, wherein the heavy slurry may be circulated for 2-4 times. In the present invention, the heavy slurry refers to a high-density drilling fluid. The purpose of circulating the high-density drilling fluid is to adjust the pressure difference between the well bore and the formation. The well wall may be ruptured and lost circulation may occur again if the pressure difference is too high. The purpose of that procedure is to adjust the pressure in the well bore to the pressure in the formation.

Hereunder the present invention will be detailed in examples.

Example 1

This example is provided to describe the gel plugging slurry prepared with the preparation method disclosed in the present invention.

6 g special gel ZND-2 (straw yellow and transparent particles, in 8 mm particle size, the viscosity is 30 mPa·s under 1,200 s$^{-1}$ shearing rate condition) is added into 100 mL tap water, and the mixture is agitated at 3,000 rpm agitation rate for 15 min.; then 5 g glass fibers and 10 g asbestos fibers are added slowly along the agitator arm, and the mixture is agitated at 3,000 rpm agitation rate for 30 min.; next, 30 g walnut shells (in 5 mm particle size) are added slowly along the agitator arm, and the mixture is agitated at 3,000 rpm agitation rate for 27 min.; finally, 35 g millimicro barite powder (in 5 μm particle size) is added slowly along the agitator arm, and the mixture is agitated for 12 min.; thus, a plugging slurry A1 is obtained.

Gel slug plugging for well drilling is simulated and tested with a plugging tester, i.e., the obtained plugging slurry A1 is transferred into the plugging tester and the bearing capacity (i.e., the plugging effect) is measured. The test data is shown in Table 1.

Example 2

This example is provided to describe the gel plugging slurry prepared with the preparation method disclosed in the present invention.

A plugging slurry is prepared with the same as the method described in the example 1, except for the following difference: 3 g special gel ZND-2 (straw yellow and transparent particles, in 5 mm particle size, the viscosity is 20 mPa·s under 1,000 s$^{-1}$ shearing rate condition) is added into 100 mL tap water, and the mixture is agitated at 2,000 rpm agitation rate for 10 min.; then 2 g glass fibers and 12 g asbestos fibers are added slowly along the agitator arm, and the mixture is agitated at 2,000 rpm agitation rate for 25 min.; next, 25 g walnut shells are added slowly along the agitator arm, and the mixture is agitated at 2,000 rpm agitation rate for 25 min.; finally, 30 g millimicro barite powder is added slowly along the agitator arm, and the mixture is agitated for 10 min.; thus, a plugging slurry A2 is obtained.

Gel slug plugging for well drilling is simulated and tested with a plugging tester, i.e., the obtained plugging slurry A2 is transferred into the plugging tester and the bearing capacity (i.e., the plugging effect) is measured. The test data is shown in Table 1.

Example 3

This example is provided to describe the gel plugging slurry prepared with the preparation method disclosed in the present invention.

A plugging slurry is prepared with the same as the method described in the example 1, except for the following difference: 9 g special gel ZND-2 (straw yellow and transparent particles, in 10 mm particle size, the viscosity is 40 mPa·s under 1,500 s$^{-1}$ shearing rate condition) is added into 100 mL tap water, and the mixture is agitated at 4,000 rpm agitation rate for 20 min.; then 3 g glass fibers and 15 g asbestos fibers are added slowly along the agitator arm, and the mixture is agitated at 4,000 rpm agitation rate for 35 min.; next, 35 g walnut shells are added slowly along the agitator arm, and the mixture is agitated at 4,000 rpm agitation rate for 30 min.; finally, 40 g millimicro barite powder is added slowly along the agitator arm, and the mixture is agitated for 15 min.; thus, a plugging slurry A3 is obtained.

Gel slug plugging for well drilling is simulated and tested with a plugging tester, i.e., the obtained plugging slurry A3 is transferred into the plugging tester and the bearing capacity (i.e., the plugging effect) is measured. The test data is shown in Table 1.

Example 4

This example is provided to describe the gel plugging slurry prepared with the preparation method disclosed in the present invention.

A plugging slurry is prepared with the same as the method described in the example 1, except for the following difference: the special gel ZND-2 is replaced with ZND-1 (straw yellow and transparent particles, in 6 mm particle size, the viscosity is 30 mPa·s under 1,100 s$^{-1}$ shearing rate condition); thus, a plugging slurry A4 is obtained.

Gel slug plugging for well drilling is simulated and tested with a plugging tester, i.e., the obtained plugging slurry A4 is transferred into the plugging tester and the bearing capacity (i.e., the plugging effect) is measured. The test data is shown in Table 1.

Example 5

This example is provided to describe the gel plugging slurry prepared with the preparation method disclosed in the present invention.

A plugging slurry is prepared with the same as the method described in the example 1, except for the following difference: after the mixture is agitated at 3,000 rpm agitation rate for 30 min., 12 g walnut shells and 18 g oyster shells (the particle size of the oyster shells is 9 mm, and the particle size of the walnut shells is 5 mm) are added slowly along the agitator arm; thus, a plugging slurry A5 is obtained.

Gel slug plugging for well drilling is simulated and tested with a plugging tester, i.e., the obtained plugging slurry A5 is transferred into the plugging tester and the bearing capacity (i.e., the plugging effect) is measured. The test data is shown in Table 1.

Example 6

This example is provided to describe the gel plugging slurry prepared with the preparation method disclosed in the present invention.

A plugging slurry is prepared with the same as the method described in the example 1, except for the following difference: cotton seed balls (in 50 μm particle size) are further added, besides the glass fibers and asbestos fibers; in addition, the mass content ratio of the glass fibers to the asbestos fibers to the cotton seed balls is 1.2:1.7:1; thus, a plugging slurry A6 is obtained.

Gel slug plugging for well drilling is simulated and tested with a plugging tester, i.e., the obtained plugging slurry A6 is transferred into the plugging tester and the bearing capacity (i.e., the plugging effect) is measured. The test data is shown in Table 1.

Example 7

This example is provided to describe the gel plugging slurry prepared with the preparation method disclosed in the present invention.

A plugging slurry is prepared with the same as the method described in the example 1, except for the following difference: the asbestos fibers are replaced with cotton seed balls (in 50 μm particle size); thus, a plugging slurry A7 is obtained.

Gel slug plugging for well drilling is simulated and tested with a plugging tester, i.e., the obtained plugging slurry A7 is transferred into the plugging tester and the bearing capacity (i.e., the plugging effect) is measured. The test data is shown in Table 1.

Comparative Example 1

6 g special gel ZND-2 is added into 100 mL tap water, and the mixture is agitated at 3,000 rpm agitation rate for 15 min.; thus, a gel plugging slurry D1 is obtained.

The obtained plugging slurry D1 is transferred into a plugging tester, and the bearing capacity (i.e., plugging effect) of the plugging slurry is measured. The test data is shown in Table 1.

Comparative Example 2

5 g glass fibers and 10 g asbestos fibers are added into 100 mL tap water, and the mixture is agitated at 3,000 agitation rate for 30 min.; then, 30 g walnut shells are added slowly along the agitator arm, and the mixture is agitated at 3,000 rpm agitation rate for 27 min.; next, 35 g millimicro barite powder is added slowly along the agitator arm, and the mixture is agitated for 12 min.; thus, a plugging slurry D2 is obtained.

The obtained plugging slurry D2 is transferred into a plugging tester, and the bearing capacity (i.e., plugging effect) of the plugging slurry is measured. The test data is shown in Table 1.

Comparative Example 3

A plugging slurry is prepared with the same as the method described in the example 1, except for the following difference: the components are added in a different order, specifically:

Special gel ZND-2 is added into 100 mL tap water; then, walnut shells are added slowly along the agitator arm; next, millimicro barite powder is added slowly along the agitator arm; finally glass fibers and asbestos fibers are added slowly along the agitator arm; thus, a plugging slurry D3 is obtained.

The obtained plugging slurry D3 is transferred into a plugging tester, and the bearing capacity (i.e., plugging effect) of the plugging slurry is measured. The test data is shown in Table 1.

Comparative Example 4

A plugging slurry is prepared with the same as the method described in the example 1, except for the following difference: the doses of the components are different, specifically:

0.5 g special gel ZND-2 is added into 100 mL tap water; then, 1 g glass fibers and 2 g asbestos fibers are added slowly along the agitator arm; next, 8 g walnut shells are added slowly along the agitator arm; finally, 10 g millimicro barite powder is added slowly along the agitator arm; thus, a plugging slurry D4 is obtained.

The obtained plugging slurry D4 is transferred into a plugging tester, and the bearing capacity (i.e., plugging effect) of the plugging slurry is measured. The test data is shown in Table 1.

Comparative Example 5

A plugging slurry is prepared with the same as the method described in the example 1, except for the following difference: the doses of the components are different, specifically:

20 g special gel ZND-2 is added into 100 mL tap water; then, 15 g glass fibers and 30 g asbestos fibers are added slowly along the agitator arm; next, 50 g walnut shells are added slowly along the agitator arm; finally, 60 g millimicro barite powder is added slowly along the agitator arm; thus, a plugging slurry D5 is obtained.

The obtained plugging slurry D5 is transferred into a plugging tester, and the bearing capacity (i.e., plugging effect) of the plugging slurry is measured. The test data is shown in Table 1.

Comparative Example 6

A plugging slurry is prepared with the same as the method described in the example 1, except for the following difference: the particle sizes of the components are different, specifically:

Condition of the special gel ZND-2: 2 mm particle size.
The particle size of the walnut shells is 1 mm; the particle size of the millimicro barite powder is 20 μm; thus, a plugging slurry D6 is obtained.

The obtained plugging slurry D6 is transferred into a plugging tester, and the bearing capacity (i.e., plugging effect) of the plugging slurry is measured. The test data is shown in Table 1.

Comparative Example 7

A plugging slurry is prepared with the same as the method described in the example 1, except for the following difference: The mass content ratio of the glass fibers to the asbestos fibers is 1:1.

The obtained plugging slurry D7 is transferred into a plugging tester, and the bearing capacity (i.e., plugging effect) of the plugging slurry is measured. The test data is shown in Table 1.

Comparative Example 8

A plugging slurry is prepared with the same as the method described in the example 1, except for the following difference: The walnut shells are replaced with oyster shells, and the particle size of the oyster shells is 4 mm.

The obtained plugging slurry D8 is transferred into a plugging tester, and the bearing capacity (i.e., plugging effect) of the plugging slurry is measured. The test data is shown in Table 1.

TABLE 1

| Examples | Fracture length × width (mm) | Pressure (MPa) | Fracture length × width (mm) | Pressure (MPa) |
|---|---|---|---|---|
| Example 1 | 30 × 1 | 7 | 30 × 3 | 5 |
| Example 2 | 30 × 1 | 6.8 | 30 × 3 | 4.7 |
| Example 3 | 30 × 1 | 6.8 | 30 × 3 | 4.5 |
| Example 4 | 30 × 1 | 6.2 | 30 × 3 | 4.5 |
| Example 5 | 30 × 1 | 6.5 | 30 × 3 | 4.8 |
| Example 6 | 30 × 1 | 6.2 | 30 × 3 | 4.4 |
| Example 7 | 30 × 1 | 6 | 30 × 3 | 4.1 |
| Comparative example 1 | 30 × 1 | 1 | 30 × 3 | 0.5 |
| Comparative example 2 | 30 × 1 | 3 | 30 × 3 | 1 |
| Comparative example 3 | 30 × 1 | 2 | 30 × 3 | 1 |
| Comparative example 4 | 30 × 1 | 2 | 30 × 3 | 0.7 |
| Comparative example 5 | 30 × 1 | 1 | 30 × 3 | 0.5 |
| Comparative example 6 | 30 × 1 | 2 | 30 × 3 | 0.8 |
| Comparative example 7 | 30 × 1 | 1 | 30 × 3 | 0.5 |
| Comparative example 8 | 30 × 1 | 2 | 30 × 3 | 0.7 |

It is seen from Table 1: in the case that the fracture length is 30 mm and the fracture width is 1 mm, with the plugging slurry prepared in the present invention, lost circulation doesn't occur until the pressure reaches the peak (e.g., in the example 1) or the pressure is 6-6.8 MPa (e.g., in the examples 2-7); a plugging slurry prepared from gel solely is lost completely when the pressure reaches 1 MPa (e.g., in the comparative example 1); a plugging slurry prepared from a bridge plugging material solely is lost when the pressure reaches 3 MPa (e.g., in the comparative example 2) or the pressure is 1-2 MPa (e.g., in D3-D4).

When the fracture width is increased to 3 mm, with the plugging slurry prepared in the present invention, lost circulation doesn't occur until the pressure reaches 5 MPa (e.g., in example 1) or the pressure is 4.1-4.8 MPa (e.g., in examples 2-7); in contrast, the plugging slurry is lost completely when the pressure is 0.5 MPa in D1; the plugging slurry is lost completely when the pressure is 1 MPa in D2; the plugging slurry is lost completely when the pressure is 1 MPa in D3; the plugging slurry is lost completely when the pressure is 0.7 MPa in D4; the plugging slurry is lost completely when the pressure is 0.5 MPa in D5; the plugging slurry is lost completely when the pressure is 0.8 MPa in D6; the plugging slurry is lost completely when the pressure is 0.5 MPa in D7; the plugging slurry is lost completely when the pressure is 0.7 MPa in D8.

The results demonstrate that the gel slug plugging method for well drilling disclosed in the present invention has advantages including high bearing capacity and easy operation.

While the present invention is described above in detail in some preferred embodiments, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed amount in the present invention and falling in the protection scope of the present invention.

The invention claimed is:

1. A gel plugging slurry for well drilling, comprising water, a special gel, a bridging material, a linking material, and a packing material, wherein, based on 100 parts by weight of the water, the amount of the special gel is 1-15 parts by weight, the amount of the bridging material is 8-20 parts by weight, the amount of the linking material is 20-40 parts by weight, and the amount of the packing material is 25-45 parts by weight wherein the special gel comprises ZND-1, ZND-2, or a combination of both, wherein the special gel comprises transparent, straw-yellow particles of 5-10 mm particle size, and the viscosity of the special gel is $5 \times 10^5$ to $8 \times 10^5$ mPa·s under 1-10 s$^{-1}$ low shearing rate condition and 20-40 mPa·s under 1,000-1,500 s$^{-1}$ high shearing rate condition, wherein the bridging material is a mixture of glass fibers and asbestos fibers, and the mass amount ratio of the glass fibers to the asbestos fibers is (0.2-0.8):1.

2. The gel plugging slurry according to claim 1, wherein, based on 100 parts by weight of the water, the amount of the special gel is 3-9 parts by weight, the amount of the bridging material is 12-18 parts by weight, the amount of the linking material is 25-35 parts by weight, and the amount of the packing material is 30-40 parts by weight.

3. The gel plugging slurry according to claim 1, wherein, the linking material comprises oyster shells, walnut shells, or a combination of both.

4. The gel plugging slurry according to claim 1, wherein, the packing material comprises millimicro barite powder, and the particle size of the packing materials is 0.1-10 μm.

5. A method for preparing a gel plugging slurry, comprising the following steps:
   (1) adding 1-15 parts by weight of special gel, 8-20 parts by weight of bridging material, 20-40 parts by weight of linking material, and 25-45 parts by weight of packing material into 100 parts by weight of water sequentially wherein the special gel comprises ZND-1, ZND-2, or a combination of both, wherein the special gel comprises transparent, straw-yellow particles of 5-10 mm particle size, and the viscosity of the special gel is $5 \times 10^5$ to $8 \times 10^5$ mPa·s under 1-10 s$^{-1}$ low shearing rate condition and 20-40 mPa·s under 1,000-1,500 s$^{-1}$ high shearing rate condition, wherein the bridging material is a mixture of glass fibers and asbestos fibers, and the mass amount ratio of the glass fibers to the asbestos fibers is (0.2-0.8):1; and
   (2) mixing homogeneously under an agitation condition.

6. The method according to claim 5, wherein, the agitation rate is 1,000-5,000 rpm and the agitation time is 1-2.5 hours.

7. A slug plugging method, comprising the following steps:
   (1) packing a well bore with packers;
   (2) pumping the gel plugging slurry of claim 5 to a leaking formation, and holding the gel plugging slurry in still state; and
   (3) removing the packers and applying pressure to the well bore to squeeze the plugging slurry to the pores and fractures in the leaking formation until the pressure in the well bore and the pressure in the formation are balanced.

8. The method according to claim 7, wherein step (1), the packer comprises a releasing packer, a self-sealing test packer, or a layering packer.

9. The method according to claim 7, wherein step (2), the pumping conditions include: an operating pressure of 1-20 MPa; a temperature of 15-30° C.; a flow rate of 10-15 m³/h; and an outlet diameter of DN100-120 mm.

10. The gel plugging slurry according to claim 1, wherein the mass ratio of the glass fibers to the asbestos fibers is (0.4-0.6):1.

11. The gel plugging slurry according to claim 3, wherein the particle size of the oyster shells is 5-15 mm and the particle size of the walnut shells is 2-8 mm.

12. The gel plugging slurry according to claim 11, wherein the particle size of the oyster shells is 8-10 mm and the particle size of the walnut shells is 4-6 mm.

13. The gel plugging slurry according to claim 4, wherein the particle size of the packing materials is 4-6 μm.

14. The method according to claim 6, wherein the agitation rate is 2,000-4,000 rpm.

15. The method according to claim 7, wherein step (2), the holding conditions include a temperature of 20-25° C. and a time of 0.5-1 hour.

16. The method according to claim 7, wherein step (3), the pressure is 3-10 MPa.

\* \* \* \* \*